(12) United States Patent
Haider et al.

(10) Patent No.: US 6,211,324 B1
(45) Date of Patent: Apr. 3, 2001

(54) HYDROPHOBIC POLYURETHANE ELASTOMER

(75) Inventors: Karl W. Haider, McKees Rocks; Jack C. Chan, Coraopolis, both of PA (US); E. Haakan Jonsson, Cologne (DE); Uli W. Franz, Coraopolis, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/327,659

(22) Filed: Jun. 8, 1999

(51) Int. Cl.$^7$ .................................................. C08G 18/10
(52) U.S. Cl. .............................. 528/65; 528/75; 525/123; 525/130; 525/131
(58) Field of Search ....................... 528/75, 65; 525/123, 525/130, 131

(56) References Cited

U.S. PATENT DOCUMENTS

| | | | |
|---|---|---|---|
| 5,247,023 | 9/1993 | Chung et al. | 525/288 |
| 5,403,904 | 4/1995 | Nubel et al. | 526/139 |
| 5,512,635 | 4/1996 | Nubel et al. | 525/247 |
| 5,519,101 | 5/1996 | Nubel et al. | 526/142 |
| 5,559,190 | 9/1996 | Nubel et al. | 525/270 |
| 5,750,815 | 5/1998 | Grubbs et al. | 585/511 |
| 5,925,724 | * 7/1999 | Cenens et al. | 528/85 |

OTHER PUBLICATIONS

Saunders & Frisch; Polyurethanes; Part I; p. 311, 1962.*

* cited by examiner

*Primary Examiner*—Rachel Gorr
(74) *Attorney, Agent, or Firm*—Joseph C. Gil; N. Denise Brown; Noland J. Cheung

(57) ABSTRACT

A hydrophobic polyurethane elastomer is disclosed comprising an isocyanate terminated prepolymer comprising: i) from 30 to 90 percent by weight of an OH terminated homopolymer of butadiene having molecular weight ranging from 1000 to 4000 and an OH functionality of from 1.9 to 2.1; ii) from 10 to 70 percent by weight of an isocyanate and an asymmetric diol chain extender having a molecular weight ranging from 75 to 200.

10 Claims, No Drawings

HYDROPHOBIC POLYURETHANE ELASTOMER

FIELD OF THE INVENTION

The present invention relates to a hydrophobic polyurethane elastomer prepared by combining a polybutadiene diol and a diisocyanate to form an isocyanate terminated prepolymer and chain extending the prepolymer with an asymmetric diol.

BACKGROUND OF THE INVENTION

It is well known to prepare isocyanate terminated polyurethane prepolymers from polyether and or polyester polyols and aromatic diisocyanates. Furthermore, it is also well known to prepare polyurethane elastomers by chain extending these prepolymers with low molecular weight diols. The resulting polyurethanes have excellent mechanical properties, but are rather hydrophilic, which can limit their utility in certain moisture sensitive applications.

Hydroxyl terminated polyols with very non-polar backbones (e.g., hydroxyl functional polybutadiene) can be used to introduce hydrophobicity into polyurethane elastomers. However, the mechanical properties of the resulting polyurethane elastomers are generally rather poor when they are prepared using the conventional diisocyanates and diol chain extenders. In particular, they suffer from poor tear strengths and low elongation at break. In addition, the elastomers are opaque. This combination of properties limits their utility in applications requiring optical clarity or good resistance to tearing.

The modest mechanical properties of the polybutadiene containing polyurethane elastomers are probably at least partially due to the high functionality of the commercially available polybutadiene polyols (2.2 to 2.8 functional). In contrast, the polyether or polyester polyols used to make polyurethane elastomers with excellent mechanical properties generally have functionalities very near 2.0.

Hydroxy-terminated polybutadienes having a functionality of 2.0 are disclosed in Chung, et al. (U.S. Pat. No. 5,247,023), Grubbs, et al. (U.S. Pat. No. 5,750,815) and Nubel, et al. (U.S. Pat. Nos. 5,512,635, 5,559,190, 5,519,101 and 5,403,904). These diols, when formulated into polyurethane systems, may offer the opportunity to produce hydrophobic polyurethane elastomers with improved mechanical properties over the current state of the art.

SUMMARY OF THE INVENTION

The present invention relates to a hydrophobic polyurethane elastomer comprising:

A) An isocyanate terminated prepolymer comprising:
i) from about 30 to 90 percent by weight of an OH terminated homopolymer of butadiene having a molecular weight ranging from 1000 to 4000 and an OH functionality of from 1.9 to 2.1;
ii) from about 10 to 70 percent by weight of an isocyanate.
B) An asymmetric diol chain extender having a molecular weight ranging from 75 to 200.

Surprisingly, it was determined that with the hydroxy terminated polybutadiene described above, an asymmetric diol chain extender (e.g., 2,2,4-trimethylpentane-1,3-diol) was necessary to produce elastomeric materials. In addition, these elastomers were optically clear and showed dramatic improvement in tear strength and elongation at break over conventional polybutadiene based elastomers.

DETAILED DESCRIPTION OF THE INVENTION

The present invention relates to a hydrophobic polyurethane elastomer prepared by combining an isocyanate terminated prepolymer prepared from monomeric diisocyanate and a polybutadiene polyol and chain extending the prepolymer with an asymmetric diol.

The prepolymers of the present invention are prepared from monomeric diisocyanates and OH terminated homopolymers of butadiene. The prepolymers of the present invention have an NCO content ranging from 4 to 12%, and most preferably 6 to 10%.

Suitable monomeric diisocyanates may be represented by the formula $$R(NCO)_2$$

in which R represents an organic group. The molecular weight of these diisocyanates is about 160 to 400, preferably about 160 to 300 and more preferably 160 to 250. Diisocyanates preferred for the process according to the invention are those in which R represents a divalent araliphatic hydrocarbon group having 7 to 15 carbon atoms or a divalent aromatic hydrocarbon group having 6 to 15 carbon atoms.

Examples of suitable organic diisocyanates include 4,4'-diphenyl-methane diisocyanate (and mixtures thereof with 2,4'-diphenylmethane diisocyanate and/or 2,2'-diphenylmethane diisocyanate), 1,4-phenylene-diisocyanate and 1,5-naphthalene-diisocyanate.

Examples of suitable polyols are OH terminated homopolymers of butadiene having a functionality ranging from 1.9 to 2.1, preferably 1.95 to 2.0 and a molecular weight ranging from 1000 to 4000, preferably 2000 to 2500. Examples of suitable OH terminated homopolymers of butadiene are those described by the general formula given below:

$$HO[CH_2-CH=CH(CH_2)_2-CH=CH-CH_2]_nCH_2-CH=CH-CH_2OH,$$

wherein n is a number average value from 8 to 36.

The NCO terminated prepolymer is chain extended with an asymmetric diol which gives optically clear, elastomeric materials. The asymmetric diol has a low molecular weight ranging from 75 to 200, preferably ranging from 140 to 150. Examples of suitable diols include 1,2-propanediol, 1,2- and 1,3-butane diol, 2,2,4-trimethylpentane-1,3-diol (TMPD), 2-ethyl-1,3-hexanediol, 1,2-, 1,3- and 1,4-pentanediol. The preferred chain extender is TMPD.

Of course, the prepolymer of the present invention may include catalysts, plasticizers, light stabilizers, and antioxidants.

The elastomers of the present invention can be used for elastomers, gaskets, seals, films and encapsulants.

The invention is further illustrated but is not intended to be limited by the following examples in which all parts and percentages are by weight unless otherwise specified.

EXAMPLES

Polyol A: A polybutadiene polyol having an OH number of 46 mg KOH/g and a functionality of 2.4 to 2.6. This polyol is available commercially from Elf-Atochem as the Poly bd R-45HT.

Chain Extender: 2,2,4-trimethylpentane-1,3diol commercially available from Eastman Chemical.

Example 1

Synthesis of Dihydroxyl Terminated Polybutadiene

To a clean, dry, $N_2$ purged reactor was added freshly distilled 1,4-diacetoxy-2-butene (154 g; 1.80 mol).

Un-stabilized 99% 1,5-cycloocta-diene (1760 g; 32.5 mol) was added to the reactor and a stream of $N_2$ was allowed to bubble through the reaction mixture for 30 minutes. The catalyst, bis(tricyclohexylphosphine) benzylidene-ruthenium dichloride (3.06 g; 3.7 mmol) was dissolved in a minimal amount of dichloromethane under a nitrogen blanket and added to the reaction mixture. The mixture was heated slowly to 50° C. Cooling was applied as needed to control the temperature of the mildly exothermic reaction. After 8 hours at 50° C., vinyl acetate (0.625 g; 7.3 mmol) was added to the mixture to inactivate the catalyst. The mixture was stirred for an additional hour and then cooled to room temperature. NMR analysis of the crude product indicated >98% conversion of monomer. The crude polymer was poured into a mixture of methanol (6 liter) and 1 N hydrochloric acid (500 ml) and stirred for 1 hour to precipitate the polymer. The methanol solution was decanted and the precipitate once again added to a mixture of methanol (6 liter) and hydrochloric acid (1 N; 500 ml) and stirred for 1 hour. The methanol layer was removed and the polymer precipitated from methanol (4 liter) three more times. The polymer was dissolved in tetrahydrofuran (4 liter) and placed into a reactor, which was subsequently cooled to 0° C. Sodium methoxide (809 g; 3.7 mol) was added as a 25 wt.% solution in methanol. The drop-wise addition took place over a 40 minute period, and the mixture was allowed to stir at 0° C. for an additional 5 hours. The reaction mixture was warmed to room temperature and poured into methanol (6 liter). The pH of the methanol was maintained at 4 to 5 by addition of concentrated HCL as needed. The methanol solution was then decanted and the residual polymer was precipitated once again from a solution of methanol (6 liter) and 1 N HCL (500 ml). The polymer precipitate was then washed three times with 6 liters of methanol containing 500 ml of water, followed by two washings with 6 liters of methanol. The methanol layer was removed by decanting. The polymer was further purified by removing excess solvent via vacuum distillation.

Analysis of the resulting dihydroxyfunctional polybutadiene showed it to have an OH # of 52.0 mg KOH/g and a viscosity of 800 mPa•s at 25° C. NMR spectroscopy revealed a broad singlet at 5.4 ppm (vinyl protons), a broad singlet at 2.1 ppm (methylene protons) and two small doublets at 4.15 and 4.05 ppm corresponding to the methylene protons adjacent to the hydroxyl end-groups in the cis and trans configurations.

Example 2

Synthesis of an Isocyanate Terminated Prepolymer from Diphenylmethane-4,4'-diisocyanate and the Dihydroxyl Terminated Polybutadiene of Example 1

Diphenylmethane-4,4'-diisocyanate (MDI) was pre-heated in a vented oven to 60° C. The molten MDI (150 g; 1.20 eq.) was added to a three necked reactor equipped with overhead stirring, a thermocouple, and a vacuum adapter. The polyol from Example 1 (350 g; 0.324 eq.) was added to the reaction flask. The mixture was heated to 80° C. and allowed to stir at that temperature for 3.0 hours. The resulting prepolymer had an NCO content of 6.93% as determined by standard n-butylamine titration.

Example 3

Synthesis of a Polyurethane Elastomer According to the Invention

The prepolymer of Example 2 (47.5 g; 0.0784 eq.) was removed from the reaction flask (still at 80° C.) and poured into a disposable can. A small sample vial containing 2,2,4-trimethylpentane-1,3-diol was pre-heated to 60° C. and a sample of the diol (5.5 g; 0.0753 eq.) was added to the prepolymer. The mixture was stirred rapidly and the clear yellow liquid was poured into a plaque mold (4"×4"×⅛×) that had been pre-heated to 110° C. After 3 hours, the plaque was removed from the mold and allowed to post-cure at 110° C. for 18 hours. The resulting plaque was optically clear, tough and elastic. The elastomer could not be torn or broken by hand. The mechanical properties of this elastomer are shown in Table 1 below:

TABLE 1

Mechanical properties of the elastomers

| Mechanical Property | Example 3 (According to the Invention) | Example 9 (Comparative) | Example 10 (Comparative) |
|---|---|---|---|
| Shore A @ 1 sec. | 87 | 83 | 90 |
| Shore D @ 1 sec | 37 | 35 | 43 |
| Resilience (%) | 54 | N/A | 54 |
| Die C Tear (pli) | 285 | 125 | 285 |
| Tensile Strength (psi) | 1225 | 940 | 1450 |
| 100% Modulus (psi) | 770 | — | 1060 |
| Ultimate Elongation (%) | 325 | 75 | 190 |
| Appearance | clear | opaque | clear |

Comparative Examples 4–7 were prepared with a series of symmetric diol chain extenders commonly used in polyurethane chemistry. The resulting polyurethanes were too soft and tacky to be de-molded after three hours without destroying the sample. Even after an 18-hour cure in the mold, the samples were waxy solids that cracked and broke if they were flexed by hand.

Example 4

Synthesis of a Polyurethane—Comparative Example

The prepolymer of Example 2 (49.5 g; 0.0817 eq.) was removed from the reaction flask (still at 80° C.) and poured into a disposable can. A small sample vial containing 1,4-butanediol was pre-heated to 60° C. and a sample of the diol (3.5 g; 0.0778 eq.) was added to the prepolymer. The mixture was stirred rapidly and the milky liquid was poured into a plaque mold (4"×4"×⅛") that had been pre-heated to 110° C. After 3 hours, the plaque was too soft and cheesy to be removed from the mold. The plaque was allowed to cure in the mold at 110° C. for 18 hours. The resulting plaque was opaque and could be readily broken by flexing or tearing.

Example 5

Synthesis of a Polyurethane—Comparative Example

The prepolymer of Example 2 (48.5 g; 0.0800 eq.) was removed from the reaction flask (still at 80° C.) and poured into a disposable can. A small sample vial containing 1,6-hexanediol was pre-heated to 60° C. and a sample of the diol (4.5 g; 0.0763 eq.) was added to the prepolymer. The mixture was stirred rapidly and the milky liquid was poured into a plaque mold (4"×4"×⅛") that had been pre-heated to 110° C. After 3 hours, the plaque was too soft and cheesy to be removed from the mold. The plaque was allowed to cure in the mold at 110° C. for 18 hours. The resulting plaque was opaque and could be readily broken by flexing or tearing.

Example 6

Synthesis of a Polyurethane—Comparative Example

The prepolymer of Example 2 (47.5 g; 0.0784 eq.) was removed from the reaction flask (still at 80° C.) and poured into a disposable can. A small sample vial containing 1,8-octanediol was pre-heated to 60° C. and a sample of the diol (5.5 g; 0.0753 eq.) was added to the prepolymer. The mixture was stirred rapidly and the milky liquid was poured into a plaque mold (4"×4"×⅛") that had been pre-heated to 110° C. After 3 hours, the plaque was too soft and cheesy to be removed from the mold. The plaque was allowed to cure in the mold at 110 ° C. for 18 hours. The resulting plaque was opaque and could be readily broken by flexing or tearing.

Example 7

Synthesis of a Polyurethane—Comparative Example

The prepolymer of Example 2 (49.5 g; 0.0817 eq.) was removed from the reaction flask (still at 80° C.) and poured into a disposable can. A small sample vial containing 2-methyl-1,3-propanediol was pre-heated to 60° C. and a sample of the diol (3.5 g; 0.0778 eq.) was added to the prepolymer. The mixture was stirred rapidly and the milky liquid was poured into a plaque mold (4"×4"×⅛") that had been pre-heated to 110° C. After 3 hours, the plaque was too soft and cheesy to be removed from the mold. The plaque was allowed to cure in the mold at 110° C. for 18 hours. The resulting plaque was opaque and could be readily broken by flexing or tearing.

Comparative Examples 8 to 10 illustrate that one does not achieve the combination of optical clarity, high elongation, and good tear strength of the present invention with a conventional polybutadiene polyol, using either a symmetric diol (Example 9) or an asymmetric diol (Example 10) as the chain extender.

Example 8

Synthesis of an Isocyanate Terminated Prepolymer from Diphenylmethane-4,4'-diisocyanate and Polyol A—Comparative Example Diphenylmethane-4,4"-diisocyanate (282.1 g; 2.26 eq.) was warmed to 60° C. and poured into a 3-necked reactor equipped with an overhead stirrer, thermocouple, and a vacuum adapter. The isocyanate was stirred at 60° C., as polyol A (717.9 g; 0.589 eq.) was added (pre-heated to 60° C.) to the reactor. The mixture was allowed to stir as the temperature of the reaction mixture was increased to 80° C. The reaction flask was evacuated (<0.1 mm Hg) and held at 80° C. for 3.5 hours. An aliquot of the prepolymer was withdrawn and titrated for isocyanate content using standard n-butyl amine titration (6.67% NCO).

Example 9

Synthesis of a Polyurethane—Comparative Example

The prepolymer of Example 8 (318.4 g; 0.506 eq.) was removed from the reaction flask (still at 80° C.) and poured into a disposable can. A sample vial containing 1,4-butanediol (BD) was pre-heated to 60° C. and a sample of BD (21.7 g; 0.482 eq.) was added to the prepolymer. The mixture was stirred rapidly and the milky liquid was poured into a plaque mold (8"×8"×⅛") that had been pre-heated to 110° C. After curing for 18 hours at 110° C., the sample was removed from the mold. The resulting plaque was opaque and elastic. The elastomer could not be torn or broken by hand. The mechanical properties of this plaque are shown in Table 1. Compared with the elastomer of the invention, it has a significantly lower tear strength and elongation at break.

Example 10

Synthesis of a Polyurethane—Comparative Example

The prepolymer of Example 8 (300 g; 0.476 eq.) was removed from the reaction flask (still at 80° C.) and poured into a disposable can. A sample vial containing 2,2,4-trimethylpentane-1,3diol (TMPD) was pre-heated to 60° C. and a sample of TMPD (33.1 g; 0.453 eq.) was added to the prepolymer. The mixture was stirred rapidly and the clear yellow liquid was poured into a plaque mold (8"×8"×⅛") that had been pre-heated to 110° C. After 3 hours, the plaque was removed from the mold and allowed to post-cure at 110° C. for 18 hours. The resulting plaque was optically clear and elastic. The elastomer could not be torn or broken by hand. The mechanical properties of this plaque are shown in Table 1. Compared with the elastomer of the invention, it has significantly lower elongation at break.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A hydrophobic polyurethane elastomer comprising:
    A) an isocyanate terminated prepolymer comprising:
        i) from 30 to 90 percent by weight of an OH terminated homopolymer of butadiene having a molecular weight ranging from 1000 to 4000, an OH functionality of from 1.9 to 2.1, and which comprises about 100% 1,4-butadiene microstructure;
        ii) from 10 to 70 percent by weight of an isocyanate; and
    B) an asymmetric diol chain extender having a molecular weight ranging from 75 to 200.
2. The elastomer according to claim 1 wherein said butadiene is dihydroxyl terminated polybutadiene.
3. The elastomer according to claim 1, wherein said isocyanate is 90 to 100% by weight diphenylmethane 4,4'-diisocyanate and from 0 to 10% by weight 2,4- and/or 2,2'-diphenylmethane diisocyanate.
4. The elastomer according to claim 1, wherein said chain extender is selected from the group consisting of 1,2 propanediol, 1,2- and 1,3-butane diol, 2,2,4-trimethylpentane-1,3-diol (TMPD), 2-ethyl-1,3-hexanediol, 1,2-, 1,3- and 1,4-pentanediol.
5. The elastomer according to claim 4, wherein said chain extender is 2,2,4-trimethylpentane-1,3-diol (TMPD).
6. The elastomer according to claim 1, wherein said hydroxyl terminated butadiene has an OH functionality ranging from 1.95 to 2.0.
7. The elastomer according to claim 1, wherein said isocyanate terminated prepolymer and said chain extender are combined at an NCO/OH index of between 50 and 150.
8. The elastomer according to claim 1, wherein said isocyanate terminated prepolymer has an isocyanate content ranging from 4 to 12%.

9. A hydrophobic polyurethane elastomer comprising:
A) an isocyanate terminated prepolymer comprising:
  i) from 55 to 80 percent by weight of an OH terminated homopolymer of butadiene having a molecular weight of about 2150 and an OH functionality of from 1.95 to 2.0., and which comprises about 100% by weight of 1,4-butadiene microstructure; and
  ii) from 20 to 45 percent by weight of diphenylmethane 4,4'-diisocyanate; and
B) 2,2,4-trimethylpentane-1,3 diol (TMPD).

10. The elastomer of claim 9, wherein A) and B) are combined at an NCO/OH index of 90 to 110.

* * * * *